United States Patent [19]
Young et al.

[11] Patent Number: 5,789,700
[45] Date of Patent: Aug. 4, 1998

[54] GROUNDING DEVICE WITH MOUNTING BRACKETS

[76] Inventors: J. Ronald Young; Dorothy J. Young, both of 9900 LaView Cir., Roswell, Ga. 30075

[21] Appl. No.: 589,060

[22] Filed: Jan. 19, 1996

[51] Int. Cl.⁶ ............................................. H02G 7/18
[52] U.S. Cl. ........................ 174/40 CC; 200/48 SB; 248/74.1
[58] Field of Search .................. 174/40 CC, 40 R; 248/300, 74.1, 316.1; 361/107; 200/79, 48 KB, 48 SB, 48 V

[56] References Cited

U.S. PATENT DOCUMENTS

| | | | |
|---|---|---|---|
| 556,823 | 3/1896 | Jewett | 174/40 CC |
| 2,233,826 | 3/1941 | Allison | 200/79 |
| 3,761,865 | 9/1973 | Bomgaars et al. | 174/40 R |
| 4,195,192 | 3/1980 | Hackney et al. | 174/40 R |
| 4,408,695 | 10/1983 | Balkwill et al. | 220/3.3 |
| 5,255,150 | 10/1993 | Young et al. | 361/107 |

*Primary Examiner*—Kristine L. Kincaid
*Assistant Examiner*—Joseph Waks
*Attorney, Agent, or Firm*—James B. Middleton

[57] ABSTRACT

A grounding device for positively grounding a broken electrical conductor has a primary body having a mounting post extending therefrom. A bracket is fixed to the pole carrying the conductor, and a clamp connects the mounting post to the bracket. To raise the grounding device, an extension bracket is fixed to the bracket, and the grounding device is clamped to the extension bracket. A secondary body is rotatable with respect to the primary body. A spring-urged tongue carried by the primary body is held in place by hooks on the secondary body; so, when the secondary body is rotated, the hooks are moved, and the tongue is projected from the housing.

8 Claims, 2 Drawing Sheets

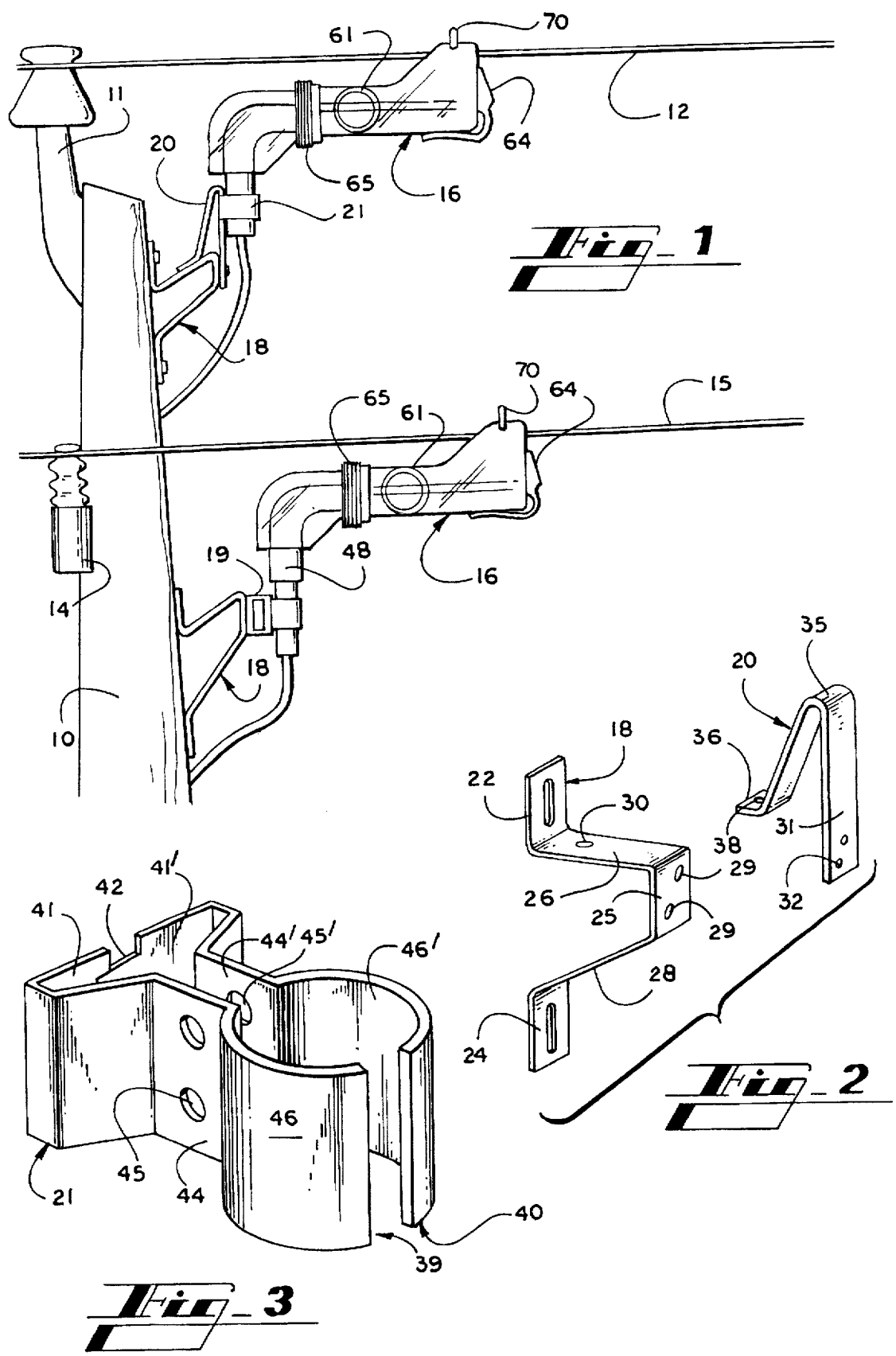

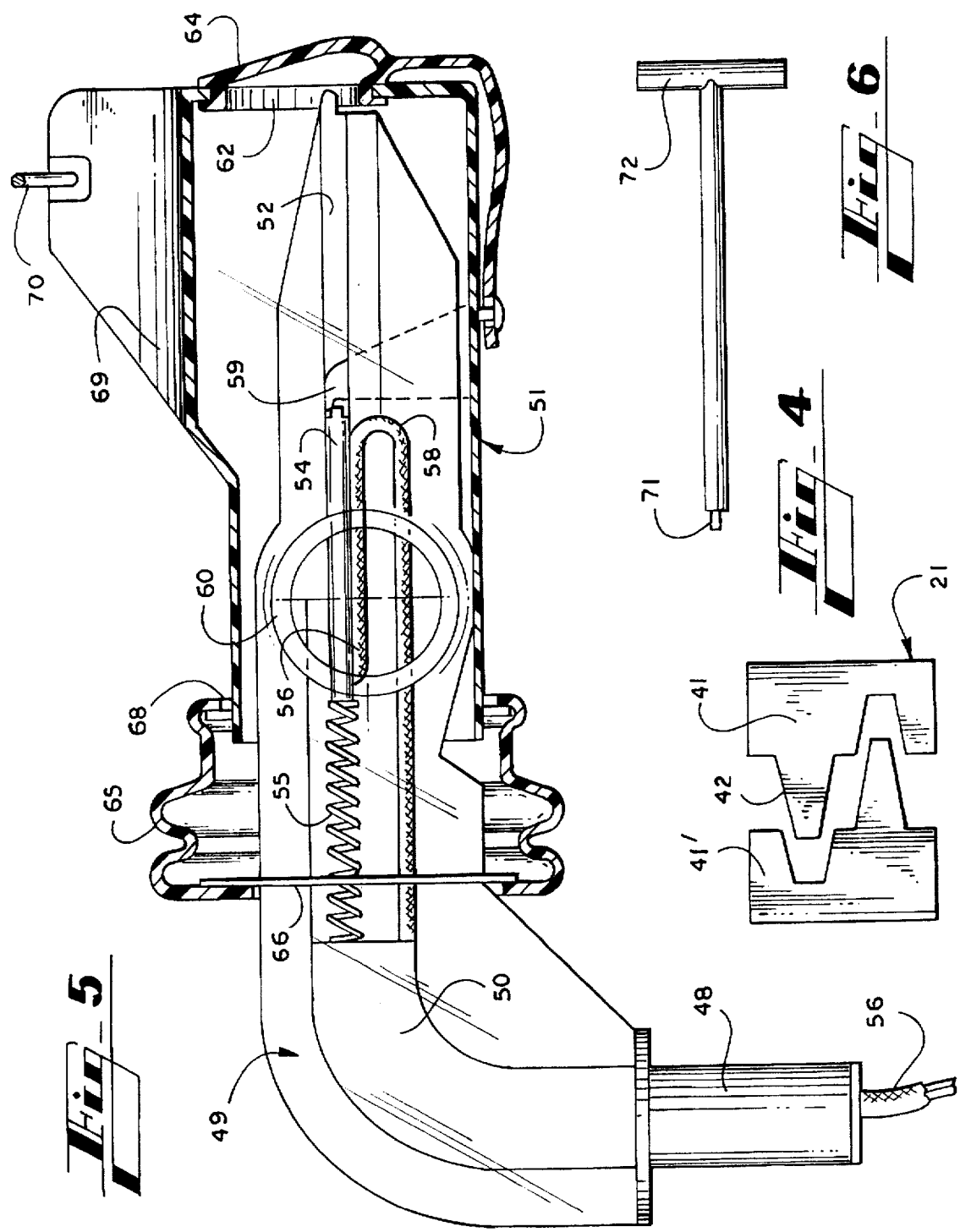

1
GROUNDING DEVICE WITH MOUNTING BRACKETS

BACKGROUND OF THE INVENTION

1. Field of the Invention

This invention relates generally to safety devices for electric power lines, and is more particularly concerned with an improved grounding device and means for mounting the grounding device.

2. Discussion of the Prior Art

Electric power lines typically include circuit breakers so that, if a short circuit occurs, the breaker will be thrown out to protect the equipment. It is well known, however, that when a power line breaks and falls to the ground, the connection to ground is frequently not sufficient to throw the circuit breaker. The result is that a live, high voltage line is lying where it can be engaged by people, and constitutes a considerable hazard. There have been some efforts to devise means to assure that the circuit breaker is thrown out when a power line breaks, but the designs have not been such as to meet today's needs.

The present inventors designed a safety device to meet the needs of today's power lines. The design is disclosed and claimed in U.S. Pat. No. 5,255,150, and the disclosure of that patent is incorporated herein by this reference. While the inventors' prior device worked well, it was difficult to provide the proper amount of insulation of electrically conductive parts in order to meet the standard safety requirements.

SUMMARY OF THE INVENTION

The present invention provides a grounding device having a primary body with a grounding tongue slidable therein. In its retracted position, the tongue is electrically insulated from power lines; and, in its projected position, the tongue is exposed outside the housing for engaging a power line. There is a secondary body movable with respect to the primary body. The secondary body carries latching means for selectively holding the grounding tongue in its retracted position, and also includes guiding means for directing an electrical conductor to a predetermined portion of the primary body. The grounding device is supported just below an electrical conductor so that, if the conductor breaks, the conductor will engage the secondary body and cause motion relative to the primary body. Such motion will release the latching means, causing the grounding tongue to be projected and engage the conductor.

The present invention further includes bracket means for supporting the grounding device of the present invention from the poles carrying the power lines. A principal bracket will mount either one grounding device, or a cross-arm to support two or more grounding devices. An extension bracket can be fixed to the principal bracket for supporting a grounding device above the principal bracket.

BRIEF DESCRIPTION OF THE DRAWINGS

These and other features and advantages of the present invention will become apparent from consideration of the following specification when taken in conjunction with the accompanying drawings in which:

FIG. 1 is a side elevational view of a utility pole having power lines attached thereto, and showing two grounding devices made in accordance with the present invention supported adjacent to the conductors;

2

FIG. 2 is a perspective view showing a mounting bracket made in accordance with the present invention, the extension bracket being exploded from the principal bracket;

FIG. 3 is a perspective view of a mounting clamp for connecting a grounding device to a bracket;

FIG. 4 is a rear elevational view of the mounting clamp;

FIG. 5 is an enlarged side elevational view of a grounding device as shown in FIG. 1, the device being partially in cross-section and the grounding tongue being in retracted position; and, FIG. 6 is an elevational view showing a tool for resetting the device.

DETAILED DESCRIPTION OF THE EMBODIMENT

Referring now more particularly to the drawings, and to that embodiment of the invention here chosen by way of illustration, FIG. 1 illustrates a utility pole 10 having a pole top pin 11 carrying a conductor 12, and a cross-arm 14 carrying a conductor 15. Each of the conductors 12 and 15 has a grounding device 16 adjacent thereto.

Looking first at the lower conductor 15, it will be seen that a bracket 18 is fixed to the pole 10 by lag screws or the like. A cross-arm 19 is fixed to the forward plate of the bracket 18; and, the grounding device 16 is carried by the cross-arm 19. As will be discussed in more detail later, the bracket 18 is vertically adjustable for accurate positioning of the grounding device 16 with respect to the conductor 15.

When a conductor is carried by a pole top pin, such as the pin 11, it will be understood that the conductor 12 is so high that the grounding device 16 cannot be properly placed using only the bracket 18. The bracket 18 would need to be so high that both flanges could not be fixed to the pole 10. Thus, the bracket 18 is used as the principal bracket, and an extension bracket 20 is fixed thereto. A clamp 21 conveniently fixes the grounding device 16 to the extension bracket 20.

In view of the foregoing discussion it will be understood that the bracket system of the present invention provides a very easy and convenient mounting means to mount the grounding devices adjacent to the conductors 12 and 15. With this overview in mind, attention is directed to FIGS. 2 and 3 which show the bracket system in more detail. FIG. 2 shows the principal bracket 18 and extension bracket 20, and FIGS. 3 and 4 show, on an enlarged scale, the clamp 21.

The principal bracket 18 is formed of heavy gauge steel or the like, and includes mounting flanges 22 and 24. The flanges 22 and 24 define vertically elongated slots to receive lag screws or other fastening means. The elongated slots allow some vertical adjustment of the bracket 18 for proper placement of the grounding device 16. The bracket 18 has a front plate 25 connected to the flanges 22 and 24 by angularly disposed struts 26 and 28. FIG. 1 shows the true shape of the struts 26 and 28, but those skilled in the art will understand that the particular angle of the struts is not critical, and one may have considerable latitude in the appearance of the bracket 18.

The front plate 25 of the bracket 18 defines holes 29 therein. The holes 29 can be used to attach a cross-arm such as the cross-arm 19, or to attach the extension bracket 20. The upper strut 26 also defines a hole 30 therein, the hole 30 being placed specifically for connection of the extension bracket 20.

The extension bracket 20 comprises a generally vertical member 31 defining two holes 32 in the lower end thereof.

The holes 32 are located, and spaced, to coincide with the holes 29 in the principal bracket 18. Screws can therefore be received through the holes 29 and 32 to fix the member 31 to the front plate 25.

The extension bracket 20 further includes a support leg 34 connected to the vertical member by a hairpin bend 35. The support leg 34 diverges from the vertical member, and terminates in a flange 36, the flange 36 defining a hole 38. When the extension bracket 20 is in place on the principal bracket 18, the holes 30 and 36 will be aligned to receive a screw therethrough.

It will therefore be understood that the principal bracket 18 can be used to mount one grounding device 16, or a cross-arm that may mount two or more grounding devices 16. Alternatively, the principal bracket 18 may mount one extension bracket 20, which can mount a grounding device 16.

While many mechanical arrangements may be utilized to fix a grounding device 16 to a bracket 18 or 20, one convenient clamping device is shown in FIGS. 3 and 4. The clamping device 21 is shown on a larger scale than the brackets 18 and 20. The clamping device 21 is made in two pieces 39 and 40 which are movable with respect to each other for tightly clamping a member therebetween. The two pieces 39 and 40 are substantially mirror images of each other.

The rear portion of the clamping device 21 is adapted to clamp onto the front plate 25 or vertical member 31 of the brackets 18 and 20. Thus, there are oppositely facing hook members 41 and 41' for engaging opposite sides of the bracket 18 or 20. Overlapping fingers 42 maintain alignment while allowing the hook members to move towards and away from each other. This is well shown in FIG. 4.

The intermediate portion of the clamping device 21 comprises a pair of plates 44 and 44' that are fixed to the hook members 41 and 41', and define holes 45 and 45' therein.

Finally, the forward portion of the clamping device 21 is designed to clamp onto the mounting post of the grounding device 16, and includes a pair of generally semi-circular clamping members 46 and 46'. The inside radius of the clamping members 46 and 46' will be about the same as the outside radius of the mounting post of the grounding device 16.

With the above description in mind, it will be understood that the clamping device 21 will have one piece 39 on one side of the bracket (e.g.) 18, and the other piece 40 on the other side of the bracket. The mounting post of a grounding device 16 will be received between the two semi-circular clamping members 46 and 46'; and, with all the pieces located properly, screws will be passed through the holes 45 and 45'. Appropriate nuts will be tightened on the screws so the pieces 39 and 40 are urged together. The hook members 41 and 41' will clamp tightly onto the bracket 18, and the semi-circular pieces 46 and 46' will clamp tightly onto the mounting post of the grounding device 16.

Turning now to the grounding device 16 as shown in FIG. 5 of the drawings, the device includes the mounting post 48 which extends into the body 49, and terminates in a right angle bend 50. As here shown, the body 49, as well as the movable body 51, are formed of dielectric material. As here shown, for purposes of illustration, the body is transparent, so the construction can be seen through the housing.

The body 49 is horizontally elongated and includes a channel 52 for slidably receiving the grounding tongue 54 which is spring urged by a spring 55. The rear end of the tongue 54 has a wire 56 attached thereto. It will be seen that the wire 56 loops as at 58, then passes rearwardly, and down through the mounting post 48. The tongue 54 is movable from the position shown in FIG. 5 to a projected position wherein the forward end of the tongue 54 extends from the outer body 51 to contact a conductor such as the conductors 12 or 15. During such motion of the tongue 54, the wire 56 will remain attached so the tongue can remain grounded through the wire 56.

To hold the tongue 54 in its retracted position, there are hooks 59. It will be noted that the upper portions of the hooks 59 are engaged by the tongue 54, so the tongue 54 cannot be projected. The hooks 59 then extend down and are fixed to the outer body 51. As a result, it will be understood that, if the outer body 51 is moved down, the hook 59 will no longer be engaged by the tongue 54, and the tongue 54 will be projected by the spring 55.

To allow movement of the outer body 51, the body 49 includes axle members 60 extending laterally from each side of the body 49. The outer body 51, then, includes a pair of hubs 61 (FIG. 1) that receive the axle members 60 so the outer body 51 is rotatable with respect to the body 49. Considering the axis of rotation to be in the center of the axle member 51, it will be seen that the hook members 59 will move down when the outer body 51 rotates with respect to the body 49.

To close the outer body 51, the front opening 62 through which the tongue 54 projects is closed by a stopper 64. The stopper 64 is elastically held in the opening 62, so the projection of the tongue 54 by the spring 55 will urge the stopper 64 from the opening 62. The rear of the outer body 51 is closed by a boot 65. The boot 65 extends from a flange 66 on the body 49 to a flange 68 on the outer body 51. The boot 65 is of an elastomeric material, so it remains sealed during motion of the outer body 51.

Those skilled in the art will understand that the conductors, such as the conductors 12 and 15, are under considerable tension while hanging from poles as shown. As a result, when a conductor breaks, the ends of the conductor move suddenly and severely in a direction opposite to the direction of the originally applied force. This movement sometimes removes the conductor from the guiding surface 69 of the grounding device 16. To hold the conductor in the proper area, the guiding surface 69 includes a bail 70 thereover. The surface 69 and the bail 70 confine the conductor 12 or 15 so it will remain in position to activate the grounding device 16.

Since the tongue 54 is well within the body 49, a tool is required to reset the device once the tongue 54 has been projected. Such a tool is shown in FIG. 6. A tip 71 can engage the tongue 54, and the T-handle 72 can be used to urge the tongue 54 rearwardly. Once the tongue 54 is held by the hook member 54, the tool can be removed, the plug 64 installed, and the device 16 is ready for another cycle.

It will of course be understood by those skilled in the art that the particular embodiment of the invention here presented is by way of illustration only, and is meant to be in no way restrictive; therefore, numerous changes and modifications may be made, and the full use of equivalents resorted to, without departing from the spirit or scope of the invention as outlined in the appended claims.

We claim:

1. A grounding device for positively grounding an electrical conductor when the conductor has broken, said grounding device comprising a primary body fixed with respect to a utility pole carrying said conductor, a secondary body carried by said primary body and movable with respect to said primary body from a ready position to a grounding position, a spring urged tongue within said grounding device when said secondary body is in said ready position and extending from said grounding device when said secondary body is in said grounding position, said primary body including opposed axle members extending laterally therefrom, said secondary body defining hub means receiving said axle members so that said secondary body is rotatable with respect to said primary body, said primary body defining a guide for said tongue, hook members fixed to said secondary body and located so that said hook members will engage said tongue when said secondary body is in said ready position and will release said tongue when said secondary body is in said grounding position.

2. A grounding device as claimed in claim 1, wherein said secondary body defines an opening through which said tongue is projected, and further including a stopper selectively receivable within said opening.

3. A grounding device as claimed in claim 2, said secondary body including guiding means for guiding the broken conductor to a predetermined location adjacent to said opening in said secondary body, and a bail for confining said conductor within said guiding means.

4. A grounding device as claimed in claim 3, and further including a boot extending between said primary body and said secondary body.

5. A grounding device as claimed in claim 1, and further including a mounting post fixed to said primary body and extending therefrom, a principal bracket for supporting said grounding device from said utility pole carrying said conductor, said principal bracket comprising a front plate, struts, and mounting flanges, said struts extending between said mounting flanges and said front plate for supporting said front plate, and clamp means for fixing said mounting post to said front plate.

6. A grounding device as claimed in claim 5, wherein said mounting flanges define elongated slots therein for receiving fastening means, said elongated slots allowing vertical adjustment of said principal bracket with respect to said utility pole.

7. A grounding device as claimed in claim 6, said struts comprising an upper strut and a lower strut, said upper strut defining a hole therein, and said front plate defining at least one hole therein.

8. A grounding device as claimed in claim 7, and further including an extension bracket selectively receivable on said principal bracket, said extension bracket comprising a vertical member having an upper end and a lower end, and defining at least one hole in said lower end, a support leg fixed to said lower end of said vertical member an extension bracket flange defining a hole therein alignable with said hole in said upper strut of said principal bracket, said at least one hole in said vertical member being alignable with said at least one hole in said front plate, said clamp means selectively fixing said grounding device to said vertical member.

* * * * *